(12) United States Patent
Frankenberg et al.

(10) Patent No.: US 10,764,849 B2
(45) Date of Patent: Sep. 1, 2020

(54) METHOD FOR ACHIEVING SYNCHRONIZATION OF TRANSMIT AND RECEIVE UNITS WITH MULTI-CARRIER SIGNAL TRANSMISSION

(71) Applicant: Siemens Aktiengesellschaft, Munich (DE)

(72) Inventors: Robert Frankenberg, Vienna (AT); Jaroslaw Kussyk, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/181,997

(22) Filed: Nov. 6, 2018

(65) Prior Publication Data
US 2019/0141648 A1 May 9, 2019

(30) Foreign Application Priority Data
Nov. 7, 2017 (EP) .................................... 17200243

(51) Int. Cl.
*H04W 4/00* (2018.01)
*H04W 56/00* (2009.01)
(Continued)

(52) U.S. Cl.
CPC ....... *H04W 56/001* (2013.01); *H04L 27/2655* (2013.01); *H04L 27/2668* (2013.01); *H04W 72/04* (2013.01); *H04B 3/54* (2013.01)

(58) Field of Classification Search
None
See application file for complete search history.

(56) References Cited

U.S. PATENT DOCUMENTS 6,654,339 B1 * 11/2003 Bohnke ................. H04L 5/0007
370/203
7,907,684 B2 * 3/2011 Richardson ............ H01Q 3/267
375/214
(Continued)

FOREIGN PATENT DOCUMENTS

| EP | 2461502 | 6/2012 |
| WO | WO99/52252 | 10/1999 |
| WO | WO2016/015782 | 2/2016 |

*Primary Examiner* — Zewdu A Beyen
(74) *Attorney, Agent, or Firm* — Cozen O'Connor

(57) ABSTRACT

A method for achieving synchronization between a transmit unit and at least one receive unit of a communications system with multi-carrier signal transmission via a transmit channel includes generating a synchronization symbol using predefined carrier frequencies, modulating the generated synchronization symbol with a predefined synchronization sequence via a transmitter to generate a synchronization signal, emitting the generated synchronization signal by the transmitter with a predefinable repetition period, the synchronization signal being utilized for transmission of an item of transmit-specific status information, receiving a signal by a receiver following transmission via the transmit channel, the received signal being formed by the emitted generated synchronization signal and transmitted repeatedly with the predefinable repetition period, and detecting and evaluating, by the receiver, the received signal via a detection algorithm, the detection algorithm determining a period of the received signal as the synchronization instant at which the synchronization signal is almost certainly present.

14 Claims, 1 Drawing Sheet

(51) Int. Cl.
*H04L 27/26* (2006.01)
*H04W 72/04* (2009.01)
*H04B 3/54* (2006.01)

(56) References Cited

U.S. PATENT DOCUMENTS

| | | |
|---|---|---|
| 2004/0114551 A1 | 6/2004 | Gavillero Martin et al. |
| 2010/0135257 A1* | 6/2010 | Higuchi .............. H04J 11/0076 370/336 |
| 2013/0136063 A1 | 5/2013 | Zhang et al. |
| 2014/0334478 A1 | 11/2014 | Cheng et al. |

* cited by examiner

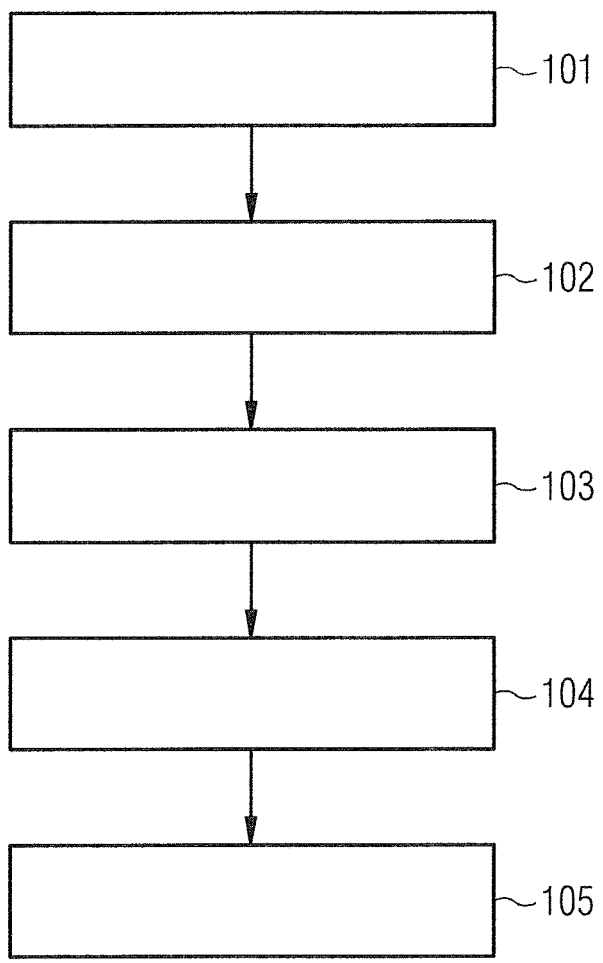

METHOD FOR ACHIEVING SYNCHRONIZATION OF TRANSMIT AND RECEIVE UNITS WITH MULTI-CARRIER SIGNAL TRANSMISSION

BACKGROUND OF THE INVENTION

1. Field of the Invention

The present invention relates to a method for achieving synchronization between a transmit unit and at least one receive unit of a communications system with multi-carrier signal transmission via a transmit channel, particularly when using Power Line Communication (PLC) and/or Power Line Carrier Communication (PLCC), where with multi-carrier signal transmission a large number of carrier frequencies of the transmit channel are used for signal transmission.

2. Description of the Related Art

For financial reasons, it is often important to use existing infrastructure (for example, telecommunication networks, telephone networks, radio networks or power networks) for transmission of information and/or data. Therefore, for example, existing electrical lines in a low voltage network or lines of high and/or medium voltage overhead lines can be used for the exchange of information and/or data between transmit units or transmitters and receive units or receivers. With the exchange of information via high and/or medium voltage overhead lines, carrier frequency systems in a frequency range between 30 kHz and 500 kHz or in some regions up to several MHz are used, with this exchange of information also being called Power Line Carrier Communication (PLCC). Use of existing, electrical lines in the low voltage network for information exchange is called Power Line Communication (PLC), where, from a technical perspective, PLC devices or systems are also carrier frequency systems.

What is known as carrier frequency technology is conventionally used for carrier frequency systems of this kind. Existing transmission routes (for example, telecommunication networks, telephone networks, radio networks or power networks) are repeatedly or optimally utilized here, where signals and/or data is modulated via one or more carrier frequencies in existing lines. One possibility for optimum utilization is enabled, for example, by a multi-carrier signal transmission or multi-carrier modulation.

With multi-carrier signal transmission, a transmit channel (i.e., a transmission route between a transmit and a receive unit) is divided into a plurality of narrow-band sub-channels with which carrier signals or carrier frequencies are associated. If an existing item of information is to be transmitted, then this is divided, for example, in the form of bits for transmission, into a plurality of different carrier signals of the transmit channel or modulated and simultaneously transmitted via the narrow-band sub-channels. What are known as symbols are used as information carriers for transmission of the information, and these are composed of individually modulated carrier signals or carrier frequencies.

A multi-carrier signal transmission method is, for example, the frequency multiplex method in which a plurality of information bits of an item of information can be transmitted simultaneously so as to be distributed among a plurality of carrier signals. For this purpose, a bandwidth available as a whole for transmission (for example, frequency band, transmit channel) is divided into different, individual narrow-band frequency bands (i.e., into sub-channels), which are separated from each other by a small, unused protective band.

A specific implementation of the frequency multiplex method that has increasingly been used in recent times is the orthogonal frequency division multiplexing method or Orthogonal Frequency Division Multiplexing (OFDM). With the orthogonal frequency division multiplexing method, a plurality of orthogonal carriers are used for the transmission of digital data or messages. Each carrier is initially separately modulated and can carry information of one or more bit(s). From a total of all modulated carriers or carrier signals a signal path of the symbol is then formed within a time window, whereby a large number of bits can be transmitted simultaneously with the orthogonal frequency division multiplexing method. A further multi-carrier signal transmission method is the Discrete Multi-tone Transmission (DMT) method, which is based on the same principles as the orthogonal frequency division multiplexing method.

In communications engineering, a facility or infrastructure for transmitting information is conventionally called a communications system. To exchange or transmit the information and/or data, for example, in the form of a bit stream, etc., the communications system establishes a communications link between at least one transmit unit or transmitter and at least one receive unit or receiver, via which link the information or data is transmitted via a transmit channel in the form of sequences comprising information units. These information units are also called symbols in the case of digital information transmission.

In order to establish a communications link, it is also necessary for the receiver to identify a grid in which the information units or symbols emitted by the transmitter arrive. This means that a clock frequency, with which symbols are emitted by the transmit unit, has to be identified by a receive unit. This recognition and matching with the clock frequency of the transmitter via the receive unit is also called synchronization. If the same clock frequency is used by transmit and receive unit, then the transmitter and receiver process the information units or symbols and/or signals to be transmitted or received synchronously or quasi-synchronously (i.e., with an admissible deviation in the synchronicity). As a rule, a period of the symbols to be transmitted is known. Consequently, the synchronization of the receive unit can be limited, for example, to a starting instant or with multi-carrier signal transmission, identify a starting phase, for example, of information or data transmission.

Specific signals and/or symbols, such as a sequence of pilot tones, chirp signals or training symbols are used, for example, before information or data transmission for synchronization of transmit and receive units in communications engineering. For example, a pilot tone is a signal, as a rule a single frequency, which is transmitted via the transmit channel outside of and independently of the actual useful signal. These specific signals and/or symbols are emitted by the transmit unit after switching on the transmit unit, with a further establishment of a connection, shortly before transmission of information, etc. These specific signals (such as for pilot tones, or chirp signals) can be detected and identified by a receive unit. From receipt of these specific signals and/or symbols, the receive unit can derive, for example, a starting instant or a starting phase of information transmission in order to be able to identify the incoming information units or symbols accordingly or to be able to determine the grids in which the information units or symbols arrive.

Use of the specific signals, such as pilot tones or chirp signals, has the drawback, however, that a synchronization, for example, owing to interference and/or channel distortions, has to emit relatively long synchronization sequences, such as sequences of pilot tones. As a result, synchronization of the receive unit can optionally occupy a relatively long period and optionally be associated by the receiver with a high storage requirement and/or great computing effort. When chirp signals are used, in which the signal frequency changes over time, owing to the changes over time in the signal frequency it is not possible to limit or adapt to selected frequency bands of the transmit channel, whereby interference on other frequency bands of the transmit channel can occur, for example. Furthermore, when specific signals or symbols are used (such as pilot tones, chirp signals, or training symbols), for example, no additional information can be transmitted before and during synchronization, or before a synchronization instant, to the receive unit (i.e., before the receiver is synchronized with the transmit unit) or to the signal emitted by the transmitter.

SUMMARY OF THE INVENTION

In view of the foregoing, it is therefore an object of the invention to provide a method for achieving synchronization of a transmit unit having at least one receive unit of a communications system with multi-carrier signal transmission, by which quick and accurate identification by the receiver of a starting instant or a starting phase of a transmission is easily enabled and with which an item of status information can also be transmitted before a synchronization instant.

This and other objects and advantages are achieved in accordance with the invention by a method for achieving synchronization of a transmit unit and at least one receive unit of a communications system with multi-carrier signal transmission via a transmit channel. A large number of carrier signals or carrier frequencies is used for multi-carrier signal transmission. The inventive method includes the following steps comprising generating a synchronization symbol using predefined carrier frequencies, modulating the generated synchronization symbol with a predefined synchronization sequence via the transmit unit to generate a synchronization signal, emitting the synchronization signal by the transmit unit repeatedly with a predefinable repetition period, where the synchronization signal is used for transmission of an item of transmit-specific status information, following transmission via the transmit channel, receiving a signal by the receive unit, where the received signal is formed by the synchronization signal emitted and transmitted with the predefinable repetition period, and detecting and evaluating the received signal via a detection algorithm by the receive unit, where the detection algorithm determines a period of the received signal as the synchronization instant at which the synchronization signal is almost certainly present.

The main aspect of the inventive method consists primarily in that, owing to a relatively short synchronization signal and owing to the detection algorithm used, a relatively quick and accurate synchronization can be achieved between the transmit and receive units with a relatively low storage requirement and computing effort, in particular by the receive unit. Furthermore, the inventive synchronization method has a low sensitivity to interference and/or channel distortions. By generating the synchronization symbol on the basis of predefined carrier frequencies of the transmit channel, frequency bands can be purposefully used for synchronization or be left unused, in order, for example, to reduce or prevent interference between frequency bands due to synchronization. In addition, use of a synchronization signal generated specifically for synchronization has the advantage of additionally transmitting, even before and during synchronization or before a synchronization instant in the receiver, transmitter-specific information, such as a status of the transmitter, a transmitter-side synchronization state, etc. As a result, for example, false alarms, etc. can be prevented and the energy requirement can be reduced.

Furthermore, it is advantageous if the synchronization symbol is generated by the transmitter in a frequency range such that a limitation to the predefined carrier frequency is obtained and a low crest factor is achieved. As a result, the synchronization symbol is limited to the predefined or desired frequency bands. In other words, the subsequently generated synchronization signal is limited very easily to carrier frequencies admissible for the transmission or the admissible frequency range of the transmit channel. Furthermore, a low crest factor has the advantage that a signal amplification of the transmit unit is better utilized.

Ideally, for generating the synchronization symbol in the frequency range, the amplitudes of the carrier frequencies used have the same value, hereinafter, for example, the value 1. The amplitudes of the unused carrier frequencies of the transmit channel are set to the value zero. A phase of each carrier frequency used for generating the synchronization symbol can be determined based on a first relationship as follows.

$$X_{k(i)} = \begin{cases} e^{j*\pi*i^2}; & i \leq \dfrac{n}{2} \\ e^{j*\pi(n-i)^2}; & i > \dfrac{n}{2} \end{cases} \qquad \text{Eq. 1}$$

Here, $X_{k(i)}$ designates a complex-valued signal vector for the respectively used carrier frequency with the index k, i designates a control variable which assumes the values 0 to n−1, where n indicates a totality of the carrier frequencies used, e the Euler's number and j the imaginary unit.

Alternatively, the phase of the carrier frequencies used for generating the synchronization symbol can also be determined from a second relationship as follows:

$$X_{k(i)} = \begin{cases} e^{j*\frac{n}{2}*\lfloor 2i^2 \rfloor}; & i \leq \dfrac{n}{2} \\ e^{j*\frac{n}{2}*\lfloor 2(n-i)^2 \rfloor}; & i > \dfrac{n}{2} \end{cases} \qquad \text{Eq. 2}$$

Here, $X_{k(i)}$ again designates a complex-valued signal vector for the respectively used carrier frequency with the index k, i designates a control variable which assumes the values 0 to n−1, where n indicates a totality of the carrier frequencies used, e the Euler's number and j the imaginary unit.

With both calculation embodiments for the complex-valued signal vector $X_{k(i)}$ for the synchronization symbol, a low crest factor is achieved, with the crest factor being slightly lower in the case of determination according to Eq. 1 than in the case of determination according to Eq. 2. However, Eq. 2 has a simpler implementation and a lower computing effort than Eq. 1. Calculation of the synchronization symbol based on one of the two relationships (i.e., equations) facilitates a significant improvement in signal power during transmission than with a symbol used for data transmission and therewith to a better signal-to-noise ratio in the receive unit. In other words, the synchronization signal based on the synchronization symbol determined in this way can be detected better and more quickly by the receiver.

In a preferred embodiment of the inventive method, an orthogonal frequency division multiplexing method (OFDM), or a Discrete Multi-tone Transmission (DMT) method is used as the multi-carrier signal transmission, and an OFDM symbol or a DMT symbol is used accordingly as the synchronization symbol.

It is advantageous if a code sequence having suitable autocorrelation properties in an associated autocorrelation function is used as the predefined synchronization sequence for modulation of the synchronization symbol. In other words, the code sequence used as the predefined synchronization sequence, such as a Barker code, for example, has in the associated periodic or aperiodic autocorrelation function, minimum side lobes or "secondary lobes". The Barker code of length 11 has, for example, an autocorrelation function with a very sharp maximum and 10 relatively small side lobes (for example, smaller by a factor of 11:1). For generating the synchronization signal, the synchronization symbol is emitted several times repeatedly, i.e., in the number of the code length/code elements, and the synchronization symbol is changed or modulated accordingly by the respective code element. The synchronization signal thereby has a duration of the synchronization symbol multiplied by the length of the predefined code sequence or the number of code elements. By using a code sequence with correspondingly suitable autocorrelation properties, such as the Barker code, the synchronization signal is emphasized particularly strongly by a detection algorithm. In other words, after a filter adapted to the signal ("matched filter"), the synchronization signal is emphasized in the receive unit as the main maximum or main lobe in the autocorrelation function of the synchronization signal. The synchronization signal can therefore be easily detected and very accurately identified.

In a particularly expedient embodiment of the invention, the transmit-specific additional information is transmitted by repeated emission of the synchronization signal and/or modulation of the predefinable repetition period of the synchronization signal. For this purpose, for example, breaks of different lengths are inserted between the repetitions of the synchronization signal for signaling particular transmitter-specific additional information. For example, different status information can therefore be very easily communicated even before and during synchronization of the receive unit. Alternatively, the amplitude and/or a polarity of the synchronization signal can advantageously be changed for transmission of the transmission-specific additional information.

It is advantageous in this connection if an item of status information of the transmit unit and/or an item of information about a synchronization state of the transmit unit is/are transmitted as the transmit-specific additional information. The receive unit can therefore be shown, for example, whether the transmit unit is already ready for transmitting data/information or whether the data for transmission is, for example, not yet available or the transmit unit has not yet been parameterized. In this way, false alarms by a device, such as the receiver, are very easily avoided.

In an advantageous embodiment of the inventive method, the receive unit, in each case a period of a received signal is continuously used for determining the synchronization instant, for the respective period of the received signal a respective mean weighted with the predefined synchronization sequence is formed as the respective master symbol, and the respective master symbol with the predefined synchronization sequence is repeated and correlated with the respective period of the received signal.

This means that the receiver progressively uses a period from the continuous, received signal for the detection algorithm. The received signal comprises the synchronization signal repeatedly emitted by the transmit unit. Ideally, the length of a synchronization signal is selected as the length of the period, which is used by the received signal for the detection algorithm. The associated master symbol is then determined for each period used and each period is checked via correlation with the master symbol associated with the predefined synchronization sequence for the presence of the synchronization signal. A synchronization instant can therefore almost certainly be easily determined, i.e., without a large storage requirement and computing effort by the receiver, very quickly and accurately.

For frequency-selective behavior, the received signal can advantageously be purged of unused frequency bands via a band filter before processing and evaluation in the receive unit.

Alternatively, the frequency-selective behavior can also be generated by sample values of the respective periods being transformed into the frequency range via a fast Fourier transform. A selection is then made by choosing the predefined carrier frequencies or carrier frequencies used by the transmitter for generating the synchronization symbol. This method involves significantly greater computing effort, however.

Amplitude damping and/or a phase rotation of the transmit channel can expediently be estimated by a comparison via the receiver of a reference symbol, which corresponds to the transmitted synchronization symbol, with that master symbol with which the synchronization instant has almost certainly been detected. For this purpose, the reference symbol is calculated by the receive unit, for example, based on the predefined carrier frequencies which have already been used by the transmit unit for generating the synchronization symbol, which reference symbol corresponds in principle to the synchronization symbol. By estimating the amplitude damping and/or phase rotation of the transmit channel, correction filters can then be calculated very easily and/or a correction of the received carrier signals/carrier frequencies carried out by the receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be illustrated by way of example below with reference to accompanying FIGURE in which:

The FIGURE schematically shows an exemplary progression of the inventive method for synchronization between a transmit unit and at least one receive unit of a communications system with multi-carrier signal transmission.

DETAILED DESCRIPTION OF THE EXEMPLARY EMBODIMENTS

The FIGURE schematically shows an exemplary progression of the method for synchronization between a transmit unit and at least one receive unit with multi-carrier signal transmission. Information and/or data is transmitted by the transmit unit via a transmit channel to at least one receive unit via multi-carrier signal transmission methods, such as orthogonal frequency division multiplexing methods (OFDM) or Discrete Multi-tone Transmission (DMT) methods. A transmitted signal consists of a temporal sequence of symbols as the information unit or carrier for the information or data for transmission, with the symbols being formed based on a large number of carrier frequencies of the transmit channel. Synchronization is necessary to establish a communications link between the transmit unit and the at least one receive unit so the receiver identifies a grid, in which grid the information units or symbols arrive, and for no errors to occur during detection and evaluation of the transmitted information and/or data.

For example, an existing infrastructure, such as telecommunication networks, radio networks, telephone networks or power networks (i.e., existing, electrical lines in the low voltage range and/or overhead lines in the high and medium voltage range) is used as the transmission medium between the transmit and receive units. With an exchange of information via high and/or medium voltage overhead lines, such as carrier frequency systems in a frequency range between 30 kHz and 500 kHz or in some regions up to several MHz are used, with this exchange of information also being called Power Line Carrier Communication (PLCC). Use of existing electrical lines in the low voltage network for the exchange of information is called Power Line Communication (PLC), wherein, from a technical perspective, PLC devices or systems are also carrier frequency systems.

With the inventive method, in a first method step 101 the transmit unit generates a synchronization symbol using predefined carrier frequencies of the transmit channel. When using the OFDM method or the DMT method the synchronization symbol is generated as an OFDM or a DMT symbol.

For improved utilization of a signal amplification of the transmit unit or improved and more accurate detection by the receiver, consideration is then given to generation of a synchronization symbol with a low crest factor. Furthermore, it is important to limit the synchronization symbol to the predefined or admissible carrier frequencies of the transmit channel. The synchronization symbol is therefore generated by the transmitter in the frequency range, enabling a limitation to the predefined or desired carrier frequencies or frequency bands.

For generation of the synchronization symbol in the first method step 101, an amplitude of the respectively used or predefined carrier frequencies is occupied by a value, in particular by the value 1. In other words, the amplitudes of the carrier frequencies used all have the same value, such as the value 1. In the case of unused or inadmissible carrier frequencies, the associated amplitude is occupied by the value zero, limiting the generated synchronization symbol to the predefined carrier frequencies.

The associated phases for the carrier frequencies respectively predefined or used for the synchronization symbol can be determined, for example, based on the following relationship:

$$X_{k(i)} = \begin{cases} e^{j*\pi*i^2}; & i \leq \frac{n}{2} \\ e^{j*\pi(n-i)^2}; & i > \frac{n}{2} \end{cases} \quad \text{Eq. 1}$$

Here, $X_{k(i)}$ designates a complex-valued signal vector for the respectively used carrier frequency with the index k, i designates a control variable which assumes the values 0 to n−1, where n indicates a totality of the carrier frequencies used, e the Euler's number and j the imaginary unit.

Alternatively, the phases for the respective carrier frequencies, which are used for generating the synchronization symbol, can also be derived from a second relationship as follows:

$$X_{k(i)} = \begin{cases} e^{j*\frac{n}{2}*[2i^2]}; & i \leq \frac{n}{2} \\ e^{j*\frac{n}{2}*[2(n-i)^2]}; & i > \frac{n}{2} \end{cases} \quad \text{Eq. 2}$$

Here, $X_{k(i)}$ again designates a complex-valued signal vector for the respectively used carrier frequency with the index k, i designates a control variable which assumes the values 0 to n−1, where n indicates a totality of the carrier frequencies used, e the Euler's number and j the imaginary unit.

The crest factor of the synchronization symbol, which results from Eq. 1, is slightly lower than the crest factor of the synchronization symbol which can be determined from Eq. 2. However, in both cases the crest factor lies below a value of 3 and therefore constitutes an improvement compared to a conventional crest factor which, for example, with data transmission via OFDM symbols, has a value of 6. In other words, with a synchronization symbol generated in accordance with Eq. 1 or Eq. 2, an improvement in the transmission (for example, of 6 dB) or a higher transmitting power (for example, by fourfold) is achieved than with the transmission of information and/or data via the transmit channel. This leads to a better signal-to-noise ratio in the receiver unit and therewith to quicker and better detectability of a synchronization signal by the receiver.

In a second method step 102, the transmit unit generates the synchronization signal based on the synchronization symbol generated in the first method step 101. For this purpose, the synchronization symbol is modulated with a predefined synchronization sequence. A code sequence with suitable autocorrelation properties in the aperiodic or periodic autocorrelation function, such as minimum side lobes or "secondary lobes" in the aperiodic or periodic autocorrelation function, such as a Barker code, is used as the predefined synchronization sequence.

In the specific embodiment of the inventive method, for example, a Barker code of length 11 is used which is shown in the following Table 1. Here i designates a control variable from 0 to 10 and $b_i$ the respective $i^{th}$ code element of the Barker code.

TABLE 1

| | | | | | i | | | | | | |
|---|---|---|---|---|---|---|---|---|---|---|---|
| | 0 | 1 | 2 | 3 | 4 | 5 | 6 | 7 | 8 | 9 | 10 |
| $b_i$ | +1 | +1 | +1 | −1 | −1 | −1 | +1 | −1 | −1 | +1 | −1 |

The autocorrelation function of the Barker code of length 11 shown in Table 1 has, for example, a very sharp maximum and 10 side lobes or secondary lobes that are smaller, for example, by a factor of 11:1 and are optionally negative. Very accurate identification of a synchronization instant by the receiver is thereby possible.

The synchronization signal is accordingly generated in the second method step 102 by modulation of the synchronization symbol with the predefined synchronization sequence. This means, for example, when using the Barker code illustrated above, that the synchronization symbol for generating the synchronization signal is provided 11 times in a row with the corresponding sign of the Barker code and is then emitted by the transmit unit in the third method step 103.

The synchronization signal generated in this way has a duration that matches a duration of the synchronization symbol multiplied by the respective code length. When using the Barker code of length 11, the duration of the synchronization signal corresponds, for example, to 11 times the length of the synchronization symbol, with the individual synchronization symbols differing only in the sign. For use of complex-valued code sequences, such as a Zadoff-Chu sequence (a complex-valued, mathematical sequence with constant amplitude and a periodic autocorrelation with side lobes or secondary lobes equal to zero) use of phase-amplitude modulation of the individual carriers in the symbols is also possible. Furthermore, only the predefined carrier frequencies or frequency bands are occupied by the synchronization signal. Other carrier frequencies of the transmit channel are not disrupted by the synchronization signal.

In the third method step 103 the transmit unit emits the synchronization signal generated in the second method step 102. In other words, the synchronization signal, which is composed of a number of synchronization symbols modulated by the predefined synchronization sequence, is repeatedly emitted with a predefined repetition period. The synchronization signal can be used for transmission of transmitter-specific status information to the at least one receive unit.

For example, an item of status information of the transmit unit, such as transmitter ready for transmitting, transmitter does not yet have any data, transmitter is not yet parameterized, etc., and/or an item of information about a synchronization state, such as first synchronization after starting of the transmitter, synchronization loss, etc., can be transmitted as the transmitter-specific status information.

The transmit-specific status information can be transmitted, for example, by repeated emission of the synchronization signal or by a change in or modulation of the predefined repetition period of the synchronization signal. For this purpose, for example, the predefined repetition period of the synchronization signal for a first item of status information can be set to the length/duration of the synchronization signal. A second, third or further item of status information can then be transmitted, for example, by changing the predefined repetition period, for example, breaks of a defined length are inserted between the repeated emission of the synchronization signal into a signal to be transmitted. These breaks can have, for example, the length of the duration of a synchronization symbol.

Alternatively, a change in an amplitude and/or polarity of the synchronization signal or a change in the synchronization signal can be made per se for transmission of the transmit-specific additional information.

In a fourth method step 104, a synchronization signal generated by the transmit unit is transmitted continuously as a signal via the transmit channel and is received by the at least one receive unit. The signal received by the receive unit is formed by the synchronization signal generated by the transmit unit and emitted with the predefined repetition period and can be distorted or attenuated by the transmit channel and/or be affected by interference.

In a fifth method step 105 the received signal is then detected and evaluated by the receiver via a detection algorithm, in particular for the presence of the synchronization signal. A period of the received signal or its temporal position is determined as the synchronization instant, in which the synchronization signal is almost certainly present, via the detection algorithm, which is based on a delay and correlation algorithm.

For this purpose, in each case a period of the received signal is continuously used in the fifth method step 105 in the at least one receive unit. Ideally, the length of the anticipated synchronization signal, such as 11 times the duration of the synchronization symbol, is selected as the length of the respective period of the received signal. Each period used is then checked via the detection algorithm for the presence of the synchronization signal. An increment of the periods can correspond, for example, to exactly one sample. In order, for example, to reduce computing effort by the receiver, a plurality of samples can also be skipped, however, such that, for example, detection can also occur only every 32 samples. In other words, not every possible period is evaluated in a digitized manner or a calculation of the correlations is not performed for every possible period since the periods almost overlap with an increment of one sample.

To be able to almost certainly determine the presence of the synchronization signal, a mean weighted with the predefined synchronization sequence is formed as the master symbol of this period for each period used of the received signal. Therefore, for example, the Barker code of length 11 is used for the purpose of weighting for forming the weighted mean of a period or the corresponding master symbol if the Barker code of length 11 was used for generating the synchronization signal. The corresponding master symbol can be determined, in accordance with a further relationship as follows:

$$s_{m,n} = \Sigma_{i=0}^{L-1} b_i^* z_{n+m+i+N_g} \qquad \text{Eq. 3}$$

Here, $s_{m,n}$ designates a sample of the master symbol at instant n of the $m^{th}$ period, L designates a length of the predefined synchronization sequence, such as L=11 with Barker code of length 11, $b_i$ designates a code element of the predefined synchronization sequence (for example, Barker code) at the $i^{th}$ position, $z_n$ designates the sample at the instant n of the $m^{th}$ period, $N_g$ designates a total length of the synchronization symbols or of the synchronization signal (including cyclical lengthening for transmission of the transmitter-specific status information) and i, n and m are control variables for numbering of the code elements, the samples and the periods.

The respectively determined master symbol is modulated with the predefined code sequence (for example, with the Barker code of length 11) (for example, with changing sign repeated according to the Barker code of length 11 used as the predefined code sequence) and a correlation performed with the entire period used for calculation of the respective master symbol. A value $w_m$ determined in this way is a measure of the probability of the synchronization signal being present in the period used.

This can occur, for example, via the following relationship:

$$w_m = \sum_{n=0}^{N-1} \sum_{k=0}^{L-1} z_{n+m+k*N_g} * b_k * \sum_{i=0}^{L-1} b_i * z_{n+m+i*N_g} =$$

$$= \sum_{n=0}^{N-1} \sum_{k=0}^{L-1} z_{n+m+k*N_g} * b_k * s_{m,n}$$

Eq. 4

Here, $w_m$ designates a measure of the probability of the presence of the synchronization signal in the $m^{th}$ period, $s_{m,n}$ designates a sample of the master symbol at instant n of the $m^{th}$ period, N designates a symbol length, L designates a length of the predefined synchronization sequence, such as L=11 with Barker code of length 11, $b_k$ designates a code element of the predefined synchronization sequence (for example, Barker code) at the $k^{th}$ position, $b_i$ designates a code element of the predefined synchronization sequence (for example Barker code) at the $i^{th}$ position, $z_n$ designates the sample at instant n of the $m^{th}$ period, $N_g$ designates a total length of the synchronization symbols or of the synchronization signal (including cyclical lengthening for transmission of the transmitter-specific status information) and i, k, n and m are control variables for numbering the code elements, samples and periods.

Equation 4 can be simplified by conversion to a further relationship in order for the receiver to determine with little computing effort the measure $w_m$ of the probability of the synchronization signal being present in the period used.

$$w_m = \sum_{n=0}^{N-1} (\sum_{k=0}^{L-1} b_k * z_{n+m+k*N_g})^2 = \sum_{n=0}^{N-1} s_{m,n}^2$$

Eq. 5

As a result of the detection algorithm, $w_m$ can be evaluated, for example, as the curve progression and ideally has a sharply limited maximum by which a synchronization instant is almost certainly marked.

For frequency-selective behavior, the received signal can, for example, have been purged of unused carrier frequencies in advance via a band filter. Alternatively, a fast Fourier transform of the sample values $z_n$ of the respective period in the frequency range in accordance with yet another relationship can also be used for generating the frequency-selective behavior, where $Z_{l,m}$ is a Fourier transform of the samples $z_{m+n}$.

$$w_m = \sum_{i=0}^{n-1} |\sum_{k=0}^{L-1} b_k * Z_{l(i),m+k+N}|^2$$

Eq. 6

A selection is made by choosing the n carrier frequencies used. This method of frequency selection is associated with a relatively high computing effort, however.

Furthermore, amplitude damping and/or a phase rotation of the transmit channel or a channel distortion can be estimated in the fifth method step 105 by a comparison via the receiver of a reference symbol with that master symbol with which the synchronization instant was almost certainly determined. For example, the synchronization symbol is determined and used as a reference symbol in the receiver because both the carrier frequencies predefined therefor and the method of determination are known. The receiver can very easily determine a correction filter by estimating amplitude damping and/or phase rotation or can correct the used or received carrier frequencies. Correction values for the individual carrier frequencies can be determined, for example, in accordance with the following relationship:

$$H_k = \frac{L * X_k}{S_k}$$

Eq. 7

Here, $H_k$ is the correction value of the respective carrier frequency and $S_k$ a Fourier transform of $s_{m,n}$ for an instant m at which the maximum of $w_m$ was detected.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for achieving synchronization between a transmit unit and at least one receive unit with multi-carrier signal transmission via a transmit channel, a large number of carrier frequencies being used for a signal transmission with multi-carrier signal transmission, the method comprising:
   generating a synchronization symbol utilizing predefined carrier frequencies;
   modulating the generated synchronization symbol with a predefined synchronization sequence via the transmit unit to generate a synchronization signal;
   emitting the synchronization signal by the transmit unit with a predefinable repetition period, the emitted synchronization signal being utilized to transmit an item of transmit-specific status information;
   receiving a signal by the receive unit subsequent to transmission via the transmit channel, the received signal being formed by the synchronization signal emitted repeatedly with the predefinable repetition period; and
   detecting and evaluating the received signal via a detection algorithm via the receive unit, the detection algorithm determining a period of the received signal as an instant of synchronization instant at which the synchronization signal is almost certainly present;
   wherein for generation of the synchronization symbol in the frequency range, an amplitude of each of the carrier frequencies utilized is occupied by an identical value, and amplitudes of unused carrier frequencies of the transmit channel are set to a value of zero.

2. The method as claimed in claim 1, wherein the synchronization symbol is generated by the transmitter in a frequency range such that a limitation to the predefined carrier frequencies is obtained and a low crest factor is achieved.

3. The method as claimed in claim 2, wherein a phase is determined for the carrier frequencies used in each case for the synchronization symbol based on a relationship in comprising one of:

$$X_{k(i)} = \begin{cases} e^{j*\pi*i^2}; & i \leq \frac{n}{2} \\ e^{j*\pi(n-i)^2}; & i > \frac{n}{2} \end{cases}$$

and $$X_{k(i)} = \begin{cases} e^{j*\frac{n}{2}*\lfloor 2i^2 \rfloor}; & i \leq \frac{n}{2} \\ e^{j*\frac{n}{2}*\lfloor 2(n-i)^2 \rfloor}; & i > \frac{n}{2} \end{cases},$$

where $X_{k(i)}$ designates a complex-valued signal vector for a respectively used carrier frequency with the index k, i designates a control variable which assumes the values 0 to n−1, and where n indicates a totality of the carrier frequencies used, e designates Euler's number and j an imaginary unit.

4. The method as claimed in claim 3, wherein the identical value has a value of 1.

5. The method as claimed in claim 1, wherein one of (i) an orthogonal frequency division multiplexing method (OFDM), (ii) and orthogonal frequency division multiplexing method (OFDM) and (iii) a Discrete Multi-tone Transmission (DMT) method is utilized for multi-carrier signal transmission; and wherein one of (i) an OFDM symbol and (ii) a DMT symbol is utilized accordingly as the synchronization symbol.

6. The method as claimed in claim 1, wherein a code sequence with one of (i) minimum side lobes and (ii) secondary lobes is utilized in an associated autocorrelation function as a predefined synchronization sequence for modulation of the synchronization symbol.

7. The method as claimed in claim 1, wherein the item of transmit-specific additional information is transmitted by at least one of (i) repeated emission of the synchronization signal and (ii) modulation of the predefinable repetition period of the synchronization signal.

8. The method as claimed in claim 7, wherein at least one of (i) amplitude damping and (ii) a phase rotation of the transmit channel are estimated by a comparison via the receiver of a reference symbol, which corresponds to the transmitted synchronization symbol, with that master symbol with which the instant of synchronization was almost certainly detected.

9. The method as claimed in claim 1, wherein a change in at least one of (i) an amplitude and (ii) a polarity of the synchronization signal is performed for a transmission of the transmit-specific additional information.

10. The method as claimed in claim 1, wherein at least one of (i) an item of status information of the transmit unit and (ii) an item of information about a synchronization state of the transmit unit is transmitted as the transmit-specific additional information.

11. The method as claimed in claim 1, wherein a period of the received signal is utilized in the at least one receive unit to continuously determine each synchronization instant; wherein a respective mean weighted with the predefined synchronization sequence is formed as a respective master symbol for a respective period of the received signal; and wherein the respective master symbol is modulated with the predefined synchronization sequence and correlated with the respective period of the received signal.

12. The method as claimed in claim 11, wherein a length of a synchronization signal is chosen as the length of the period of the received signal.

13. A method for achieving synchronization between a transmit unit and at least one receive unit with multi-carrier signal transmission via a transmit channel, a large number of carrier frequencies being used for a signal transmission with multi-carrier signal transmission, the method comprising:
generating a synchronization symbol utilizing predefined carrier frequencies;
modulating the generated synchronization symbol with a predefined synchronization sequence via the transmit unit to generate a synchronization signal;
emitting the synchronization signal by the transmit unit with a predefinable repetition period, the emitted synchronization signal being utilized to transmit an item of transmit-specific status information;
receiving a signal by the receive unit subsequent to transmission via the transmit channel, the received signal being formed by the synchronization signal emitted repeatedly with the predefinable repetition period; and
detecting and evaluating the received signal via a detection algorithm via the receive unit, the detection algorithm determining a period of the received signal as an instant of synchronization instant at which the synchronization signal is almost certainly present;
wherein for generation of the synchronization symbol in the frequency range, an amplitude of each of the carrier frequencies used is occupied by an identical value, and amplitudes of utilized carrier frequencies of the transmit channel are set to a value of zero;
wherein a phase is determined for the carrier frequencies used in each case for the synchronization symbol based on a relationship in comprising one of:

$$X_{k(i)} = \begin{cases} e^{j*\pi*i^2}; & i \leq \frac{n}{2} \\ e^{j*\pi(n-i)^2}; & i > \frac{n}{2} \end{cases}$$

and $$X_{k(i)} = \begin{cases} e^{j*\frac{n}{2}*\lfloor 2i^2 \rfloor}; & i \leq \frac{n}{2} \\ e^{j*\frac{n}{2}*\lfloor 2(n-i)^2 \rfloor}; & i > \frac{n}{2} \end{cases},$$

where $X_{k(i)}$ designates a complex-valued signal vector for a respectively used carrier frequency with the index k, i designates a control variable which assumes the values 0 to n−1, and where n indicates a totality of the carrier frequencies used, e designates Euler's number and j an imaginary unit.

14. The method as claimed in claim 13, wherein the identical value has a value of 1.

\* \* \* \* \*